No. 611,723. Patented Oct. 4, 1898.
E. WESTON.
INDEX NEEDLE OR HAND FOR ELECTRICAL MEASURING INSTRUMENTS.
(Application filed Jan. 10, 1898.)
(No Model.)
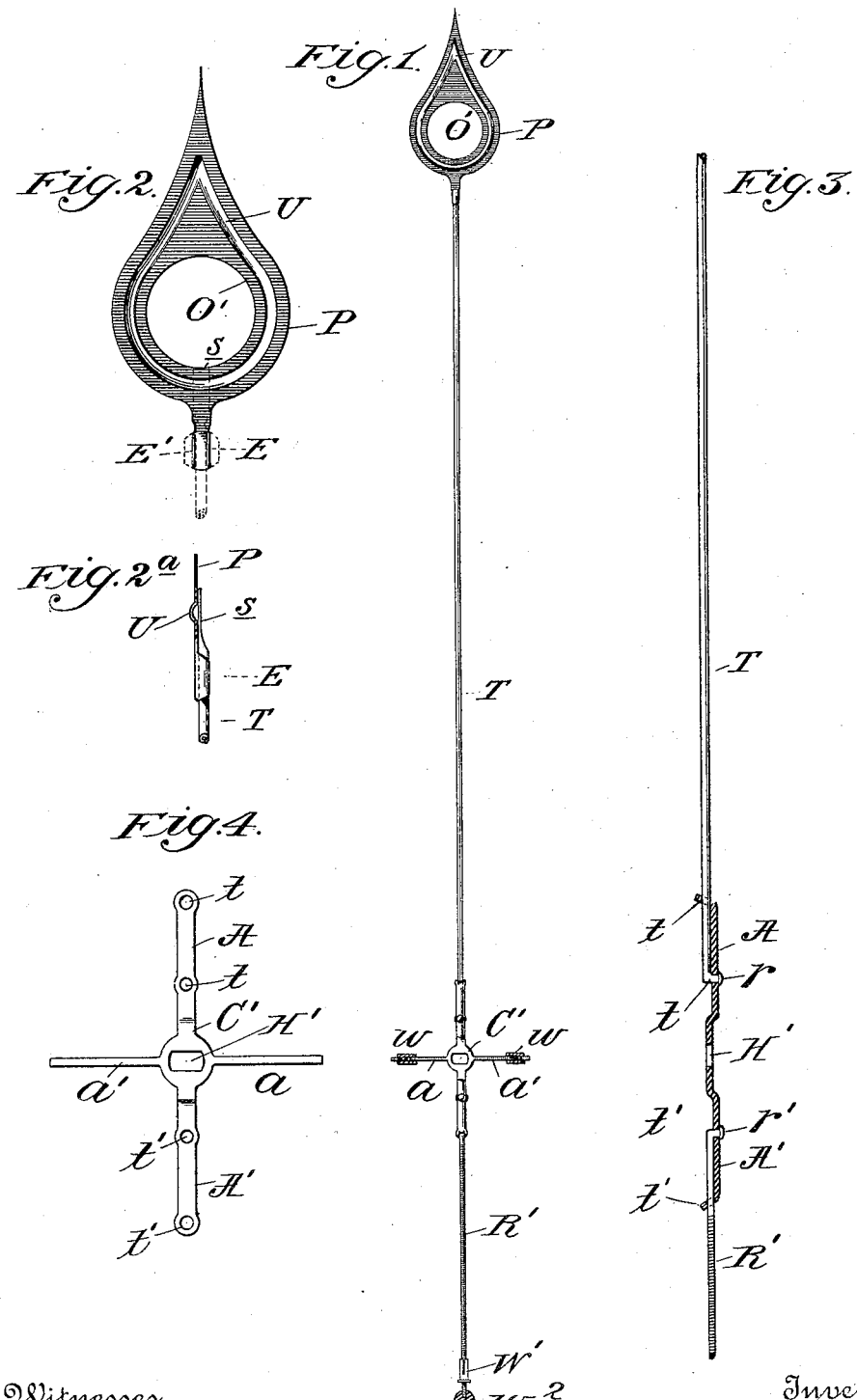
Witnesses
Inventor
Edward Weston
By his Attorney
Charles J. Kintner

UNITED STATES PATENT OFFICE.

EDWARD WESTON, OF NEWARK, NEW JERSEY.

INDEX NEEDLE OR HAND FOR ELECTRICAL MEASURING INSTRUMENTS.

SPECIFICATION forming part of Letters Patent No. 611,723, dated October 4, 1898.

Application filed January 10, 1898. Serial No. 666,145. (No model.)

*To all whom it may concern:*

Be it known that I, EDWARD WESTON, a subject of the Queen of Great Britain, residing at Newark, in the county of Essex and State of New Jersey, have made a new and useful Invention in Index Needles or Hands for Electrical Measuring Instruments, of which the following is a specification.

My invention has for its object to so devise or construct an index needle or hand for an electrical measuring instrument that it will be of minimum weight and of such strength as to withstand without damage the blows or shocks to which such instruments are often subjected in use, and it will be fully understood by referring to the accompanying drawings, in which—

Figure 1 is a full-sized plan view of my novel index needle or hand with adjustable counterweights shown in section; and Fig. 2 is an enlarged plan view of the pointer thereof, showing in dotted lines the means of attaching the same to the body part of the needle, Fig. 2ª being a detail side elevational view of the same, illustrating the like parts as they are secured together. Fig. 3 is a transverse sectional view taken through the supporting part of the needle, illustrating the body part and principal counterbalancing-arm in elevational view; and Fig. 4 illustrates an enlarged plan view of the supporting part, showing the manner of constructing the same by stamping it from a thin sheet of aluminium.

In the construction of index needles or hands for electrical measuring instruments which are required to give indications of delicate current changes it is decidedly important that all of the movable parts of the instrument possess as little weight and as great strength as possible, and it was with a view of effecting these desirable ends that the present invention was devised.

Referring now to the drawings in detail for a full and clear understanding of my novel index-needle, such as will enable any one skilled in the art to construct and use the same, T represents the body part of my novel index needle or hand, which is constructed, preferably, of a drawn tube of aluminium.

P represents the pointer, which is constructed, preferably, by stamping it out of a very thin sheet of aluminium and in the conformation shown with a central opening O' and a raised bead U, having preferably the same contour as the outer contour of the pointer itself, the function of the raised bead being to give sufficient strength to the thin material to cause it to maintain under all conditions of usage a rigid form.

E and E' are thin flat lugs or ears at the inner end of the pointer, which are designed to be wrapped around the outer end of the body portion T, as shown in Fig. 2ª, s being a flattened extension of the body portion adapted to have sufficient bearing upon the under surface of the pointer to secure it permanently in position, the parts being additionally secured together by any preferred form of cement.

C' represents the supporting part of the needle, which is preferably stamped out of a thin sheet of aluminium in such manner as to have four radially-disposed arms A A' and $a$ $a'$, the arms A and A' being preferably of greater length and width than are the arms $a$ and $a'$.

H' represents a rectangular opening in the supporting part for enabling the needle to be sustained or supported upon the movable part of the instrument.

$t$ $t$ and $t'$ $t'$ are holes or openings in the arms A and A' for securing, respectively, the body part T of the needle and the principal screw-threaded counterbalancing-arm R', made, preferably, of a light material, such as aluminium.

$w$ $w$ are adjustable screw-threaded counterweights for the arms $a$ $a'$, and W' is a similar adjustable screw-threaded counterweight for the arm R', and $w^2$ is a permanent counterweight secured to the outer end of the arm R', it, together with the arm R', being of sufficient weight to approximately counterbalance the weight of the body part T and pointer P.

In assembling the parts of this needle the arms $a$ $a'$ are first screw-threaded, as shown, and the arms A and A' are bent first outward at points near the opening H' and then again backward so that they are parallel with the supporting part C', and their outer ends are then bent downward, all as shown clearly in Fig. 3. The inner ends of the body part T and the principal counterbalancing-arm R' are then bent at right angles and inserted, respectively, through the outer openings $t\,t$ and inner openings $t'\,t'$, after which said ends are secured by riveting, as shown at $r\,r'$, and the arms A and A' are curved about the body part T and principal counterbalancing-arm R' in the manner shown in Fig. 1. The counterweights $w\,w$ and W' are then secured in place upon their respective arms, and the permanent counterweight $w^2$ is permanently secured to the lower end of the principal counterbalancing-arm R'. The needle is now ready for use and may be secured to any instrument where it is desired to apply it in the usual manner, after which it may be properly counterbalanced through the agency of the counterbalancing-weights $w\,w$ W' in order to properly compensate for inequalities of weight in the movable parts of the instrument itself.

Although I have described my novel form of index needle or hand as especially applicable to electrical measuring instruments, I do not limit its use to that purpose, as it is obvious that such an index needle or hand may have a wide use in the art of measuring instruments or instruments of precision, and my claims hereinafter made are designed to be of such scope as to include all such uses.

I make no claim in the present application to an index-needle having a supporting part with radially-disposed arms and a central opening for securing the entire needle to the pivot-support of an instrument, in combination with a tubular body part secured to one of said arms and counterweights adjustably secured to the other arms, as this constitutes in part the subject-matter of another application for a patent bearing Serial No. 666,144, filed by me in the United States Patent Office of even date herewith.

Having thus described my invention, what I claim, and desire to secure by Letters Patent of the United States, is—

1. An index needle or hand consisting of a supporting part provided with one or more counterweights and a body part having a flattened pointer provided with a stiffening-bead, substantially as described.

2. An index needle or hand having radially-disposed arms and adjustable counterweights therefor, in combination with a flattened pointer having a raised stiffening-bead of substantially the same contour as the pointer itself, substantially as described.

3. An index needle or hand having a pointer constructed from a thin sheet of metal and provided with a raised stiffening-bead, substantially as described.

4. A pointer for an index-needle constructed of thin sheet metal, having substantially the contour shown and a raised stiffening-bead of substantially the same contour.

5. An index needle or hand constructed of independent parts as follows, a supporting part having radially-disposed arms; a body part, a counterbalancing-arm for counterbalancing the body part and a flattened pointer secured to the free end of the body part together with counterweights, substantially as described.

6. An index needle or hand having a supporting part provided with radially-disposed arms, one of which supports a counterweight and the other the body part proper, together with a pointer constructed from sheet metal and provided with a stiffening-bead, said pointer being secured to the free end of the body part, substantially as described.

7. An index needle or hand constructed wholly of aluminium and consisting of a supporting part having radially-disposed arms, a body part and a thin flat pointer having a strengthening-bead, substantially as described.

8. An index needle or hand of aluminium consisting of a supporting part, a body part and a pointer, said parts being secured together in substantially the manner described.

9. An index needle or hand having a counterbalancing-arm and a permanent counterweight secured thereto, in combination with an adjustable counterweight carried by said arm, substantially as described.

In testimony whereof I have hereunto subscribed my name this 5th day of January, 1898.

EDWARD WESTON.

Witnesses:
C. J. KINTNER,
W. C. WESTON.